United States Patent

Wollum et al.

[15] 3,646,519

[45] Feb. 29, 1972

[54] METHOD AND APPARATUS FOR TESTING LOGIC FUNCTIONS IN A MULTILINE DATA COMMUNICATION SYSTEM

[72] Inventors: James E. Wollum, Glendora; Robert L. Rawlings, Diamond Bar; James Clark Davidson, Glendora, all of Calif.

[73] Assignee: Burroughs Corporation, Detroit, Mich.

[22] Filed: Feb. 2, 1970

[21] Appl. No.: 7,969

[52] U.S. Cl. ..........340/172.5, 235/153

[51] Int. Cl. ..........G06f 11/02, G05b 1/01

[58] Field of Search ..........340/172.5, 146.1, 149; 235/153

[56] References Cited

UNITED STATES PATENTS

| | | | |
|---|---|---|---|
| 3,202,972 | 8/1965 | Stafford et al. | 340/172.5 |
| 3,343,141 | 9/1967 | Hackl | 340/172.5 |
| 3,405,258 | 10/1968 | Godoy et al. | 235/153 |
| 3,420,991 | 1/1969 | Ling | 235/153 |
| 3,439,347 | 4/1969 | Goshorn et al. | 340/172.5 |
| 3,445,811 | 5/1969 | Hashimoto et al. | 235/153 |
| 3,497,685 | 2/1970 | Stafford et al. | 235/153 |
| 3,519,808 | 7/1970 | Lawder | 235/153 |
| 3,526,758 | 9/1970 | Nozawa | 235/153 |

OTHER PUBLICATIONS

IEEE Transactions on Electronic Computers, Vol. EC- 12, No. 5, pp. 887- 895, Dec. 1963, " A Computer Organization and Programming System for Automated Maintenance," by K. Maling and E. Allen.

IRE Transactions on Electronic Computers, Vol. EC- 11, No. 4, pp. 459- 465, Aug. 1962, " The Diagnosis of a Synchronous Subsequential Switching System" by S. Seshu and D. Freeman.

*Primary Examiner*—Raulfe B. Zache
*Assistant Examiner*—Jan E. Rhoads
*Attorney*—Christie, Parker & Hale

[57] ABSTRACT

A data communication system in which a single control logic function is tested by writing a test control word for one communication line into a time-shared control circuit register from a processor. The control word together with a test line input word generated by the processor are coupled to the control logic for one clock period to perform one step of the logic function, the result being stored in memory. The result is then interrogated in memory to determine if the result of the logic function meets the test.

3 Claims, 5 Drawing Figures

INVENTOR.
JAMES E. WOLLUM
ROBERT L. RAWLINGS
JAMES CLARK DAVIDSON

BY

ATTORNEYS

METHOD AND APPARATUS FOR TESTING LOGIC FUNCTIONS IN A MULTILINE DATA COMMUNICATION SYSTEM

FIELD OF THE INVENTION

This invention relates to a method and apparatus for testing the control logic if a digital device, and more particularly, is concerned with the testing of time-shared control logic of a multiline data communication system.

BACKGROUND OF THE INVENTION

In the design, manufacture, and servicing of digital processing equipment various test procedures have been devised for testing and verifying the logical equations in the equipment. This has generally been accomplished by the preparation of a handwritten test procedure which is written in such a manner that all valid functions of each flip-flop setting may be set up and tested as well as all the invalid states. The test procedure is then followed in all future tests of subsequent units as they were manufactured to determine if all the logical functions are operating correctly. Such test procedures required many hours of effort in analyzing logical equations of the equipment to determine the most expedient way of setting up the test routine. Special test equipment consisting of switches for manually setting input conditions and displays and lights for indicating output conditions are required.

The present invention provides a system of testing logical functions of a logic circuit by allowing a single logic function to occur and storing a result which can be examined programmatically or compared with known results to determine if the logic function was performed correctly. Any number of different logic functions can be tested in this manner and the results of each of such test cases automatically recorded.

SUMMARY OF THE INVENTION

In brief, the invention provides a method by which a processor can be programmatically set a test case into a register array and signal for a single logic function to occur. The result of the single function is stored and can be read out by the processor on command to be used by the processor to compare with known comparison data for verification. In its more specific application the invention is concerned with testing the control logic of a multiline data communication system in which the control circuitry for each of the lines is time-shared by scanning a plurality of stored control words from storage into a register, then applied to the logic circuit together with a test input for the line and the resulting logic function returned to the storage as the control word. The test case can be substituted in place of any control word and applied to the logic circuit only during a single scan. The word as modified by the control logic during the single scan can be read out of storage during any subsequent scan into the associated processor.

BRIEF DESCRIPTION OF THE DRAWINGS

For a more complete understanding of the invention reference should be made to the accompanying drawings wherein.

DETAILED DESCRIPTION

Figures 1, 2, 3:
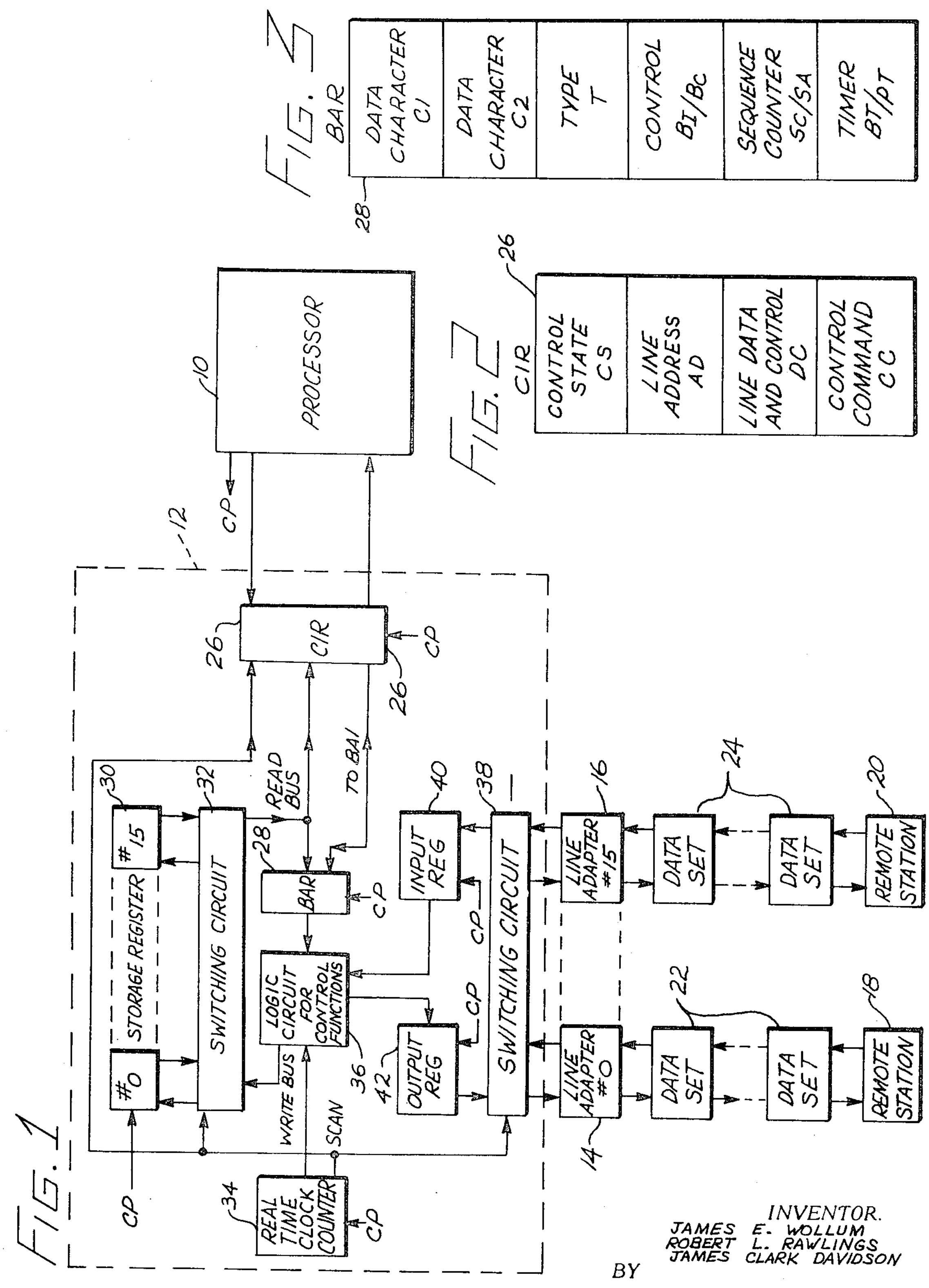
FIG. 1 is a block diagram of a data communication system incorporating the features of the present invention.
FIGS. 2 and 3 illustrate the word format in two of the registers in the communication control unit of the system of FIG. 1.

The present invention has particular application and is described in its preferred form as applied to the data communication system described in copending application Ser. No. 859,536, filed Sept. 19, 1969, and assigned to the same assignee as the present application. As therein disclosed and shown in FIG. 1 of the accompanying drawings, a data communication system for controlling a plurality of communication lines is provided for transferring data between a plurality of remote stations and a central processor. The digital processor, indicated generally at 10, transmits data to and receives data from an adapter control unit, indicated generally at 12. The adapter control unit 12 in turn transmits data to and receives data from a plurality of line adapters, two of which are indicated at 14 and 16. The number of line adapters connected to the adapter control unit 12 may, for example, be 16 in number. Each line adapter serves an associated remote station, two of which are indicated at 18 and 20. The communication between each of the adapters and its associated remote station may be over standard telephone or teletype equipment using known types of data sets, one communication line pair of data sets being indicated at 22 and a second communication line pair being indicated at 24. The control unit can accommodate a large number of different types of communication systems for transmitting digitized data between the remote stations and the processor. There are a number of such commercially available data sets or modems on the market, including both synchronous and asynchronous types.

The line adapters merely provide an interface between the adapter control unit 12 and each of the data sets. All control functions are provided by the adapter control unit 12 and are time-shared by the different line adapters. This permits the line adapter circuit to be relatively simple and inexpensive and to accommodate a number of different types of both synchronous and asynchronous digital data communication systems.

The processor 10 communicates with the adapter control unit 12 through a Control Interface Register (CIR) indicated at 26. Information read into the CIR register 26 from the processor 10 is transferred, at the proper time, into a Buffer Associative Register (BAR) 28. The adapter control unit 12 includes a storage register 30 or other memory device having 16 words of storage, one word for each associated line adapter. A switching circuit 32 selectively gates any one of the sixteen control words in the storage register 30 to a Read bus which goes to both CIR 26 and BAR 28. The switching circuit 32 is controlled by the lower order portion of a Real Time (RT) clock counter 34. The scan output from the counter 34 cycles the switching circuit 32 such that, with each clock pulse (CP) of the system clock, successive ones of the 16 control words stored in the storage register 30 are transferred by the Read bus into the BAR register. As a new control word is transferred to the BAR register 28, the previous control word is applied to the Write bus through a logic circuit for all control functions, indicated generally at 36. The Write bus is connected by the switching circuit 32 to successive ones of the word locations in the storage register 30. Thus under operation of the clock counter 34 there is a continuous scanning of each of the words stored in the storage register through the BAR register 28, logic circuit 36, and back to the storage register, the scanning cycle being repeated at 16 clock pulse intervals.

At the same time, a switching circuit 38, operated in over each of the lines is controlled by the combination of the contents switching circuit 32 by the scan output of the clock counter 34, connects the input and output lines of each of the line adapters, respectively, to an Input register (IR) 40 and an Output register (OR) 42. The contents of the Input register 40 are applied to the logic circuit 36 and the Output register 42 is in turn set by the logic circuit 36.

From the description thus far it will be seen that communication of the contents of the Input register 40 gated from the associated adapter, the BAR register 28 containing the associated control word, and the clock counter 34 by means of the output from the logic circuit 36. Control functions for all lines are carried out on a time-sharing basis, as the adapters and storage registers are continuously scanned at the clock pulse rate.

As shown in FIG. 2, a word stored in the CIR register 26 has four fields. The Control State (CS) field determines the state of the processor interface, i.e., whether the interface is in an idle state (CS = 0), occupied with information for the processor (CS = 1), or occupied with information for the BAR register (CS = 2). The word in the CIR register includes an Adapter Address (AD) field which identifies one of the sixteen adapters. The CIR register 26 also includes a Data Control (DC) field which either stores data or control information which is being transferred between the processor and the BAR register, or between the storage register 30 and the processor 10. The fourth field in the CIR register 26 is the Control Counter (CC) field which is used to identify various operations, such as the transfer path of the information in the DC field.

As shown in FIG. 3, a word stored in the BAR register 28 contains six basic fields. Two fields, designated respectively $C_1$ and $C_2$, store data characters. The third field, designated T, identifies the type of equipment being serviced on a particular communication line. For example, there may be a number of possible asynchronous types differing in baud rate from 45.5 up to 9,600 bits per second, in character size from 6 bits up to 11 bits per character, and in the numbers of stop bits per character. Each type is coded and identified in the control unit by the T field. This arrangement permits the customer to select any type of communication equipment he desires to use and to modify the adapter control unit to that equipment merely by loading the corresponding type field from the processor into the associated control word. The same line adapter circuit can be used for all standard asynchronous types of communication systems, as well as a number of standard synchronous type communication systems. In addition, as shown in FIG. 3, the control word stored in the BAR register 28 includes a BI/BC field for storing interrupts for the processor and commands for the cluster control unit. The fifth field, designated SC/SA is for counting sequence operations. The sixth field, designated BT/PT, is for controlling timing operations.

Figure 4:
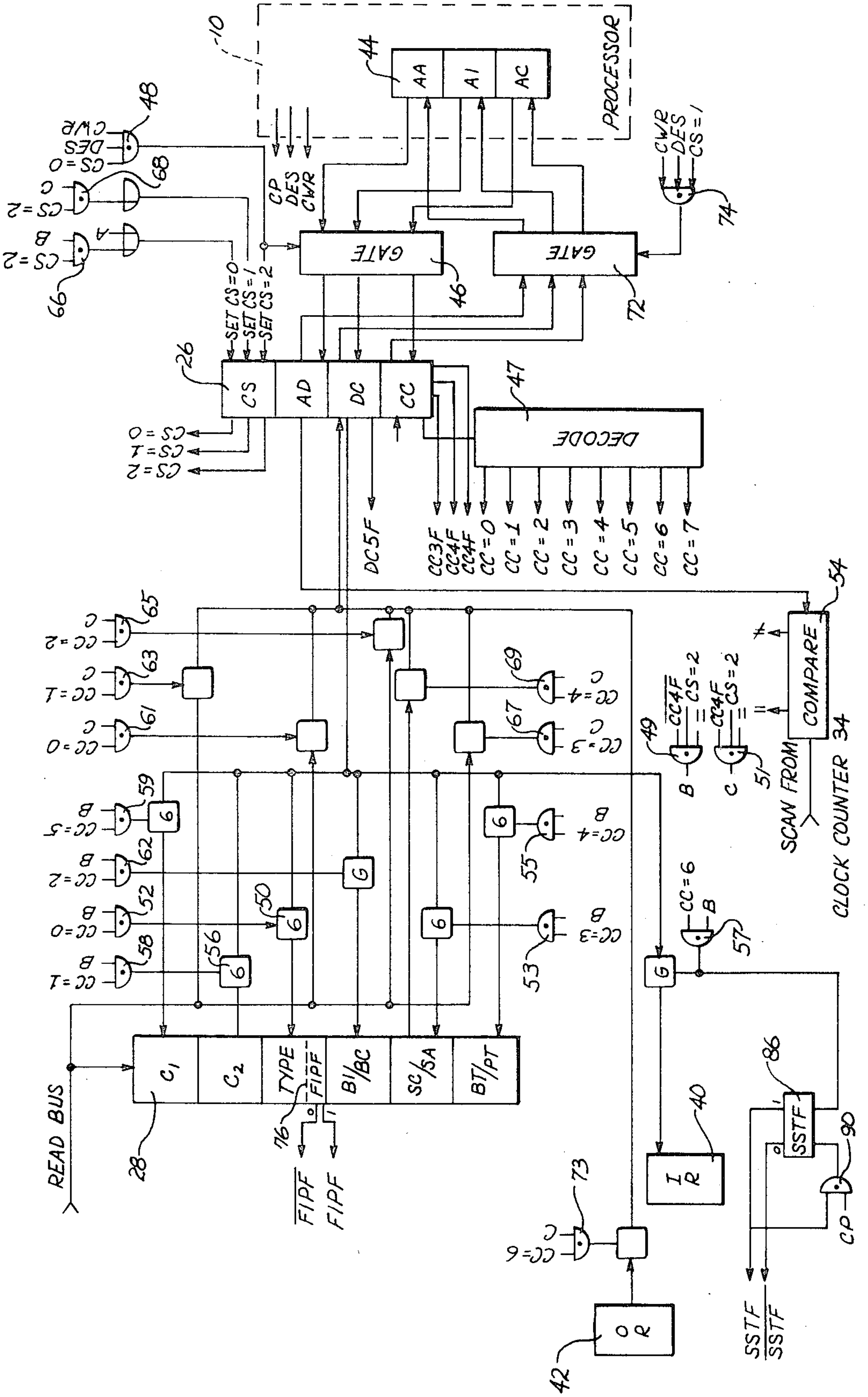
FIG. 4 is a schematic block diagram of the interface between the processor and the control unit of the system of FIG. 1.

Referring to FIG. 4, the operation of the CIR register 26 is shown in detail. The processor 10, which may be any standard general purpose digital processor, includes an Input/Output register 44, having three fields, designated AA, AI, and AC. On output, these three fields are coupled through a gate 46 to the AD, DC, and CC fields, respectively, of the CIR register 26. When the processor 10 is ready to transfer information into the control unit 12, it provides a Write signal on a control line CWR. It also designates, by a control line DES, a particular adapter control unit, where the processor is arranged to communicate with a number of such adapter control units. A logical AND-circuit 48 senses when the CWR line and the DES line from the processor go true and also senses when the CIR register is in the idle state, as indicated by the CS = 0 line from the CS field of the register. The output from the AND-circuit 48 activates the gate 46 to load the CIR register from the processor and at the same time to set the CS field to the CS = 2 state, signaling that the CIR register is loaded with information for the BAR register 28.

In order to test a logic function of the circuit 36, it is desirable to load each of the fields in the BAR register 28 as well as the Input register 40 from the processor 10. This is accomplished during the CS = 2 state in which the contents of the DC field of the CIR register 26 may be transferred to any one of the fields in the BAR register 28 or to the Input register 40 under control of the CC field of the CIR register 26. The CC field, for example, is normally loaded by the processor with five bits which are stored in a corresponding number of flip-flops in the register 26. The levels of the three lowest order flip-flops are applied to a decoder 47 having eight outputs designated CC = 0 through CC = 7. The two other bits in the CC field, designated CC3F and $\overline{CC4F}$ are used for control purposes. If CC4F is off, namely, $\overline{CC4F}$ is true, this indicates that the processor wants to write information into the BAR register 28. If the CC4F flip-flop is on, namely, CC4F is true, this indicates that the processor wants to interrogate the Read bus from the storage register 30.

Transfer of data from the DC field of the CIR register 26 to any of the fields of the BAR register 28 or the IR register 40 is accomplished in the following manner. A compare circuit 54 compares the address in the AD field of CIR register 26 designating a particular communication line with the scan count of the clock counter 34. The compare circuit 54 has two outputs designated = and ≠. When the = output of the compare circuit 54 is true, this signals that the control word of the particular line being addressed is being read out of the storage register 30 on to the Read bus. The = output is applied to two logical AND-circuits 49 and 51, together with the CS = 2 state from the CIR register 26. The AND-circuit 49 senses when the CC4F bit is off, while the AND-circuit 51 senses when the CC4F flip-flop is on. The output of the AND-circuit 49, designated B, is combined with the output to the decoder 47 in a series of logical AND circuits 52, 53, 55, 57, 58, 59 and 62. The output of the AND-circuit 52 operates a gate 50 for gating the DC field of the CIR register 26 to the type field of the BAR register 28 when CC is 0. Similarly if CC = 1, the output of the AND-circuit 58 opens a gate 56, gating the contents of the DC field to the $C_2$ field of the BAR register 28. Similarly each of the other logical AND circuits control gates for gating the contents of the DC field into respective fields in the BAR register 28 and the Input register 40 according to the value of the CC field.

The contents of any field of the selected control word as read out of the register 30 onto the Read bus may be gated into the DC field of the CIR register 26 in response to an Interrogate operation. This operation is initiated by the processor 10 by loading the CIR register in the manner described above. The CIR register is set with CS = 2 and with the CC4F flip-flop being on. This condition is indicated by the output of the logical AND-circuit 51, designated C, which is applied together with the respective outputs of the decoder 47 to a group of logical AND-circuits indicated at 61, 63, 65, 67, and 69. The output of each of these logical AND circuits controls an associated gate for gating a selected field of the control word on the Read bus to the DC field in the CIR register 26. The output of a logical AND-circuit 73 in response to the CC = 6 state gates the contents of the Output register 42 to the DC field. The DC field is then read by the processor in a manner described below.

Once the DC field has been transferred to the BAR register 28, the CS field is set to the CS = 0 or idle state by the output of an AND-circuit 66 to which is applied the CS = 2 state and the B state at the output of the AND-circuit 49. On the other hand, if there has been an Interrogation operation in which the DC field is loaded from the Read bus, the CS field of the CIR register 26 is set to CS = 1 by the output of an AND-circuit 68 which senses the presence of the CS = 2 state and the C state at the output of the AND-circuit 51. During the CS = 1 state, the contents of the CIR register 26 are transferred by a gate 72 into the register 44 of the processor. The gate 72 is operated in response to the output of an AND-circuit 74 to which is applied the DES line and the $\overline{CWR}$ from the processor and the CS = 1 line from the CIR register 26.

From the description thus far, it will be seen that the processor 10 has the capability of selectively loading any field of a selected control word in the BAR register 28, as well as the Input register 40, or to interrogate any field in the control word on the Read bus as well as the contents of the Output register 42. In order to load all the fields of the control word in the Input register 40, the processor 10 must execute a number of Write operations, thus requiring a number of scans of the selected control word in the Storage register 30. To prevent any modification of the control word during successive scans by the logic circuit 36, the test operation requires that the logic circuit 36 be bypassed until all of the test information is loaded into the BAR register 28 and Input register 40 from the processor. This is accomplished in the manner indicated in FIGS. 4 and 5. When it is desired to initiate a test routine, the processor first writes into the Type field of the BAR-register 28 from the DC field of the CIR register 26. One bit in the DC field, designated DC5F, is set to 1 by the processor to indicate that a test routing is being initiated. This bit is used to set a control flip-flop, designated FIPF, in the BAR-register 28. The control flip-flop 76 is set at the same time the Type field in the BAR register 28 is loaded through the gate 50 from the DC field. Thus the control flip-flop FIPF is set to 1 whenever a test word is present in the BAR register 28.

Figure 5:
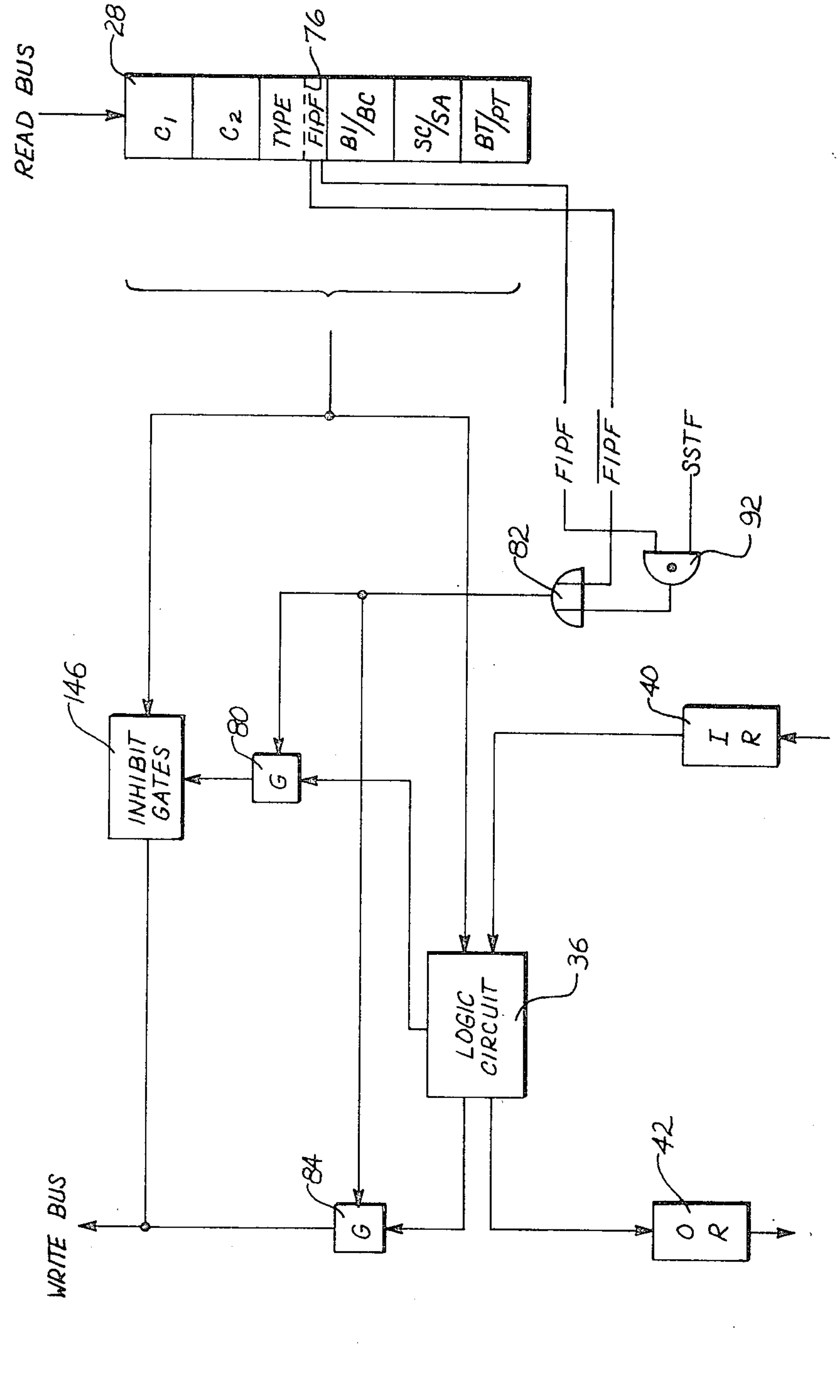
FIG. 5 is a schematic block diagram of the test logic associated with the control unit.

As best seen in FIG. 5, the FIPF flip-flop is used to apply the contents of the BAR register 28 directly to the Write bus going to the storage register 30 so as to bypass the logic circuit 36. Normally, as described in the above-identified copending application, all of the bits of the control word stored in the BAR register 28 are applied both to a logic circuit 36 and to inhibit gates 146. The inhibit gates selectively inhibit the gating of certain bits to the Write bus in response to output levels derived from the logic circuit 36. In this manner, the logic circuit 36 may change selected bits of the control word while retaining other bits unchanged during the transfer of the control word from the BAR register to the storage register over the Write bus. As shown in FIG. 5, the output levels from the logic circuit 36 are coupled to the inhibit gates through a gate 80 which is gated open when the FIPF flip-flop is in its 0 or $\overline{FIPF}$ state. This state corresponds to the normal operating state of the control system. This line is applied to the gate 80 through an OR-circuit 82, so that the gate 80 normally connects the logic circuit 36 to the control input of the inhibit gates 146. The output of the logic circuit 36 which goes to the Write bus is connected through a gate 84 which is also controlled by the output of the OR-circuit 82. Thus in normal operation, the gate 84 couples the output of the logic circuit 36 to the Write bus.

However, when a test routing is initiated, the $\overline{FIPF}$ level goes false, thus closing the gates 80 and 84. In this case, the inhibit gates 146 connect all the output levels from the BAR register 28 directly to the Write bus but the output of the logic circuit 36 is isolated by the gates 80 and 84. Thus the contents of the BAR register 28 are connected directly back to the storage register 30 unchanged by the contents of the IR register 40 or any logic function performed by the logic circuit 36. In this manner the control word remains unchanged through successive scans in which the control word is transferred from the storage register 30 through the BAR register 28 and back into the storage register 30.

During any one of the successive scans, the processor 10 can similarly modify other fields of the BAR register 28 to ultimately generate a complete test pattern in all fields of the BAR register 28, which test pattern will continue to recirculate through the BAR-register 28 by repeated scans of the storage register 30. The processor 10 can interrogate the contents of the BAR register 28 in the manner described above to determine if any errors have occurred between the information written into the various fields of the BAR register 28 and the information read out of the corresponding fields in the associated control word as read out of the storage register 30. If the control circuit is operating in normal fashion, the information read out should be identical to that written in.

In order to test the logic circuit, one function of the logic circuit can be tested at a time by loading a predetermined condition in the Input register 40 from the processor 10 and activating the logic circuit 36 for one clock period. This is accomplished by means of a single step timing flip-flop (SSTF) 86. This is controlled from the processor 10 by initiating a Write operation in which the CC field of the CIR register 26 is set to the CC = 6 state. This produces an output of the logical AND-circuit 57 which gates the contents of the DC field of the CIR register 26 to the Input register 40 and at the same time sets the SSTF control flip-flop 86 on. The control flip-flop 86 remains on for one clock pulse time and then is reset to the off state with the next clock pulse CP by the output of an AND-circuit 90. The SSTF level is applied to an AND-circuit 92 together with the FIPF level from the type field of the BAR register 28. Since the SSTF level is true for one clock interval, the logic circuit 36 is in effect activated by the opening of the gates 80 and 84, permitting a set of levels to be generated on the Write bus in response to the contents of the BAR register 28 and the Input register 40. The modified control word continues to be read out of the storage register 30 into the BAR register 28 and back into the storage register 30 without further modification by the logic circuit 36, since the FIPF bit remains on. At any time the modified control can be selectively interrogated by the processor 10 by the Interrogate operation described above.

In operation, the processor can, in the manner described above, establish any number of test patterns in the BAR register 28. A test routine is always initiated by setting the FIPF bit to 1 and loading the various fields of CIR from the processor. The test is executed by writing into the Input register 40 from the processor and at the same time turning on the SSTE flip-flop 86. The stored result can then be interrogated by the processor and the result analyzed by the processor by a suitable analytic program to determine if the desired logic function was properly performed by the logic circuit 36. Thus the entire test routine is under complete programmatic control of the processor 10. Moreover a test routine can be executed for testing any number of different logic functions of the logic circuit 36 while the equipment is operating on line. Service of only one channel is interrupted during the testing routine. All other channels or communication lines serviced by the multiline control unit are unaffected and continue to function in normal manner.

What is claimed is:

1. In a time-shared multiline control for controlling the transfer of data between a plurality of communication lines and a processor, wherein storage means having a plurality of storage locations storing control words is periodically scanned to transfer each of the control words in repetitive sequence from the storage means to a control word register and the communication lines are scanned in synchronism with the scanning of the storage locations to couple each of the lines in repetitive sequence to an input register and an output register, the contents of the input register and control word register being applied to the input of a logic circuit, the output of the logic circuit normally being coupled to each of the storage locations in the same repetitive sequence to replace each of the control words in a modified condition determined by the condition of the inputs to the logic circuit, test apparatus for testing the multiline control by the processor comprising: means responsive to the processor for loading a first test word in the control register from the processor in place of a control word transferred from the output of the storage means, bypassing means responsive to a predetermined bit in the first test word when in the control register for directly coupling the word in the control register to the storage means in place of the output of the logic circuit when the test bit is set to a first condition, whereby the first test word is written into a storage location in the storage means for loading a second test word in the input register from the processor simultaneously with the transfer of the first test word from the storage means to the control word register, and means sensing when the first test word is in the control register and the second test word is in the input register for disabling said bypassing means and loading the storage means from the output of the logic circuit.

2. Apparatus for testing a logic function of a logic circuit receiving a plurality of input bits and generating a plurality of output bits, comprising: means for storing a first group of bits, means for periodically reading out said first group of bits from the storing means, means for sensing a predetermined bit pattern in the group of bits as they are read out of the storing means, means applying the bits read out of the storing means to the logic circuit, means responsive to the sensing means when said predetermined bit pattern is not present for storing the resulting output of the logic circuit in the storage means in place of said first group of bits, means responsive to said sensing means when the predetermined bit pattern is present for bypassing the logic circuit and restoring the first group of bits to the storage means, means for applying a second group of bits to the logic circuit, and means responsive to a test signal and the sensing means when said predetermined bit pattern is present in the first group of bits read out of the storage means for storing the resulting output of the logic circuit in the storage means in place of said first group of bits.

3. A system for testing time-shared control logic in a data communication system in which a plurality of separate line control words are continuously scanned to service a plurality of communication lines, comprising: a register, a storage device for storing said line control words in a plurality of storage locations, means for transferring each of said control words from said storage locations in repetitive sequence to the register, a logic circuit having an input connected to the output of said register for generating an output condition in response to the contents of the register, whereby each control word in the register generates an output from the logic circuit, means synchronized with said transferring means for writing into each of the storage locations in repetitive sequence from a common input, switching means for selectively connecting either the output of the register or the output of the logic circuit to the common input of the writing means, means responsive to a predetermined bit condition in a control word in the register for controlling the switching means to couple the output of the register directly to the input of the writing means, and means responsive to said predetermined bit condition in the register and a control signal for controlling the switching means to couple the output of the logic circuit to the input of the writing means.

* * * * *

PO-1050
(5/69)

UNITED STATES PATENT OFFICE
CERTIFICATE OF CORRECTION

Patent No. 3,646,519 Dated February 29, 1972

Inventor(s) James E. Wollum, Robert L. Rawlings, and James Clark Davidson

It is certified that error appears in the above-identified patent and that said Letters Patent are hereby corrected as shown below:

Column 2, Line 62- Delete "over";
Line 63- Delete "each of the lines is controlled by the combination of the contents";
Line 64- Before "switching" insert --synchronism with the--;
Line 71- After "communication" insert --over each of the lines is controlled by the combination--.

Column 5, Line 6 - "routing" should read --routine--;
Line 37- "routing" should read --routine--;

Column 6, Line 19- "SSTE" should read --SSTF--.

Signed and sealed this 22nd day of August 1972.

(SEAL)
Attest:

EDWARD M.FLETCHER,JR.
Attesting Officer

ROBERT GOTTSCHALK
Commissioner of Patents